United States Patent
Seo et al.

(10) Patent No.: US 8,769,280 B2
(45) Date of Patent: Jul. 1, 2014

(54) AUTHENTICATION APPARATUS AND METHOD FOR NON-REAL-TIME IPTV SYSTEM

(75) Inventors: Dae-Hee Seo, Daejeon (KR);
Hyeok-Chan Kwon, Daejeon (KR);
Seung-Min Lee, Daejeon (KR);
Yong-Hyuk Moon, Daejeon (KR);
Jae-Hoon Nah, Daejeon (KR);
Taek-Yong Nam, Daejeon (KR);
Dong-Il Seo, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 543 days.

(21) Appl. No.: 13/170,331

(22) Filed: Jun. 28, 2011

(65) Prior Publication Data
US 2012/0159161 A1 Jun. 21, 2012

(30) Foreign Application Priority Data
Dec. 20, 2010 (KR) .................. 10-2010-0131007

(51) Int. Cl.
*H04L 9/32* (2006.01)
(52) U.S. Cl.
USPC .................. 713/168; 713/170; 380/262
(58) Field of Classification Search
None
See application file for complete search history.

(56) References Cited

U.S. PATENT DOCUMENTS

| 7,916,868 B1* | 3/2011 | Zhang | 380/255 |
| 2002/0184217 A1* | 12/2002 | Bisbee et al. | 707/9 |
| 2009/0214028 A1 | 8/2009 | Schneider | |

FOREIGN PATENT DOCUMENTS

| KR | 1020100051772 A | 5/2010 |
| WO | WO2009035283 A2 | 3/2009 |

OTHER PUBLICATIONS

Florian Winkler, Identity Management for IMS-based IPTV, IEEE "Globecom" 2008. Mar. 17, 2008.

* cited by examiner

*Primary Examiner* — Jung Kim
*Assistant Examiner* — Tri Tran
(74) *Attorney, Agent, or Firm* — William Park & Associates Patent Ltd.

(57) ABSTRACT

An authentication apparatus for a non-real-time IPTV system decrypts a first encrypted value included in a contents request message received from a device using a preset session key, and then verifies the validity of the contents request message. If the verification results of the contents request message are valid, the authentication apparatus encrypts a variation between timestamps of the authentication apparatus and the device using the session key, and then generates a second encrypted value. After verification information by which the device is capable of verifying the authentication apparatus has been generated using the second encrypted value, the authentication apparatus sends verification information, together with contents corresponding to the contents request message, to the device.

6 Claims, 5 Drawing Sheets

AUTHENTICATION APPARATUS AND METHOD FOR NON-REAL-TIME IPTV SYSTEM

CROSS REFERENCE TO RELATED APPLICATION

This application claims the benefit of Korean Patent Application No. 10-2010-0131007 filed on Dec. 20, 2010, which is hereby incorporated by reference in its entirety into this application.

BACKGROUND OF THE INVENTION

1. Field of the Invention

The present invention relates generally to an authentication apparatus and method for a non-real-time Internet Protocol Television (IPTV) system. More particularly, the present invention relates to a multi-agent-based authentication apparatus and method for a non-real-time IPTV system.

2. Description of the Related Art

According to a conventional scheme for authenticating remote users based on smart cards, the remote users are authenticated using unidirectional hash values that are created using random numbers, generated by the remote users, and passwords.

However, in the case of such a conventional scheme, an overhead may be caused on a server according to the number of users, and a security policy based on the authentication information of the users is not provided, so that it is difficult to guarantee the security of contents provided by unauthorized users. Further, in order to provide non-real-time services in heterogeneous network environments, it is difficult to provide access control and policy contents together with technology for authenticating users.

According to another conventional scheme using an Internet Protocol (IP) multimedia subsystem, authentication management technology can be simply initialized, and an anonymous and seamless service can be provided.

However, in the case of this conventional scheme, an attacker is capable of making a password-guessing attack by comparing the current password of a user with the previous password of the user using known information and the previous login information of the user during a procedure for registering the user in advance. Further, when an attacker extracts a password using a password extraction attack, he or she can generate forged login information and can be then disguised as an actual user based on the forged login information. In particular, since unidirectional identification is provided based on the security of sharing passwords, it is difficult to verify the disguised attacker and operate security policies related to services.

A further conventional scheme using a multi-agent structure uses an Intelligent Distributed Autonomous Power System (IDAPS) which is an automated agent management system for a home network.

However, according to the further conventional scheme, a hardware-based additional security system is required based on reliable entities, and, in addition, a security service is provided based on middleware similar to software, thus making it difficult to provide additional security services other than a previously defined security service. In particular, since the messages of agents are exchanged based on Transmission Control Protocol/Internet Protocol (TCP/IP) of reliable entities, confidentiality and integrity-based security services that may occur in TCP/IP-based public channels are required, but they are not provided. Further, since this scheme uses an authentication method based on the Identification (ID)/password of a user, it includes the vulnerability of existing password authentication without any changes. Therefore, the exchange of authentication information between separate agents is not performed, so that the exchange of security information in an automated format is difficult, and a security policy is not provided.

SUMMARY OF THE INVENTION

Accordingly, the present invention has been made keeping in mind the above problems occurring in the prior art, and an object of the present invention is to provide an authentication apparatus and method, which authenticate a user for the purpose of reusing contents based on one-source multi-use in an IPTV system.

In accordance with an aspect of the present invention to accomplish the above object, there is provided an authentication method for a non-real-time Internet Protocol Television (IPTV) system, including decrypting a first encrypted value included in a contents request message received from a device using a preset session key, and then verifying validity of the contents request message, generating a second encrypted value by encrypting a timestamp variation between an authentication apparatus and the device using the session key if verification results of the contents request message are valid, generating verification information for verifying the authentication apparatus by using the second encrypted value, and sending the verification information, together with contents corresponding to the contents request message, to the device.

In accordance with another aspect of the present invention to accomplish the above object, there is provided an authentication method for a non-real-time Internet Protocol Television (IPTV) system, the authentication method being configured such that an authentication apparatus authenticates a device, including establishing a session key between the authentication apparatus and the device using a timestamp of the authentication apparatus and a timestamp of the device, verifying validity of a contents request message received from the device using the session key, and sending a contents response message, which includes data corresponding to a contents identifier included in the contents request message, to the device if verification results of the contents request message are valid.

In accordance with a further aspect of the present invention to accomplish the above object, there is provided an authentication apparatus for a non-real-time Internet Protocol Television (IPTV) system, including an authentication agent, a user agent, and a policy agent. The authentication agent establishes a session key between a device and the authentication apparatus, and verifies validity of a data request message received from the device using the session key. The user agent generates verification information by which the device is capable of verifying the authentication apparatus. The policy agent sends a data response message, which includes data requested by the data request message and the verification information, to the device.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
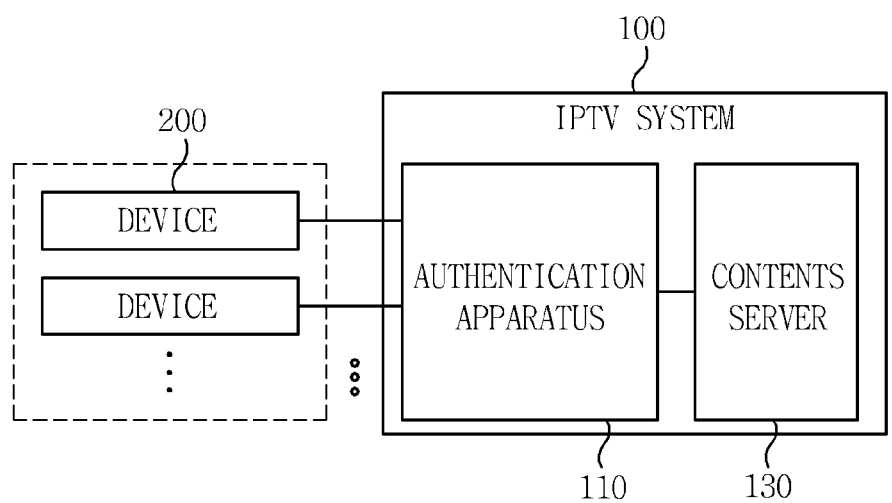
FIG. 1 is a diagram showing the construction of an Internet Protocol Television (IPTV) system according to an embodiment of the present invention.

The present invention will be described in detail with reference to the attached drawings. If in the specification, detailed descriptions of well-known functions or configurations may unnecessarily make the gist of the present invention obscure, the detailed descriptions will be omitted. The embodiments of the present invention are provided to more completely describe the present invention to those skilled in the art. Therefore, the shapes and sizes of components in the drawings may be exaggerated for clearer descriptions.

Hereinafter, an authentication apparatus and method for a non-real-time Internet protocol television system according to embodiments of the present invention will be described in detail with reference to the attached drawings.

First, an Internet protocol television system according to an embodiment of the present invention will be described with reference to FIG. 1.

FIG. 1 is a diagram showing the construction of an Internet protocol television system according to an embodiment of the present invention.

As shown in FIG. 1, an Internet protocol television system (hereinafter also referred to as an "IPTV system") 100 is a system for providing an interactive TV service to each device 200 over the Internet, and includes an authentication apparatus 110 and a contents server 130.

The authentication apparatus 110 registers and authenticates the device 200, and provides contents stored in the contents server 130 to the device 200 at the request of the device 200.

The contents server 130 provides contents stored therein to the device 200 which has been authenticated by the authentication apparatus 110.

Next, the authentication apparatus according to an embodiment of the present invention will be described with reference to FIG. 2.

Figure 2:
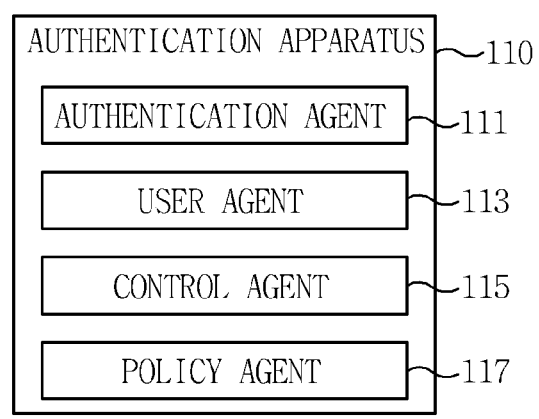
FIG. 2 is a diagram showing the construction of an authentication apparatus according to an embodiment of the present invention.

FIG. 2 is a diagram showing the construction of the authentication apparatus according to an embodiment of the present invention.

As shown in FIG. 2, the authentication apparatus 110 includes an authentication agent (hereinafter also referred to as an "AA") 111, a user agent (hereinafter also referred to as a "UA") 113, a control agent (hereinafter also referred to as a "CA") 115, and a policy agent (hereinafter also referred to as a "PA") 117.

The authentication agent (AA) 111 registers each of devices 200, and authenticates the registered device 200.

The user agent (UA) 113 stores and manages users' personal information such as the type of contents used by the users and the preference information of the users.

The control agent (CA) 115 stores and manages information about contents purchased by each user so as to enable multimedia contents to be reused.

The policy agent (PA) 117 flexibly manages security policies depending on the information of each user and the information of each device so as to provide one piece of contents to different devices.

Next, a method in which a device establishes a session key according to an embodiment of the present invention will be described with reference to FIG. 3.

Figure 3:
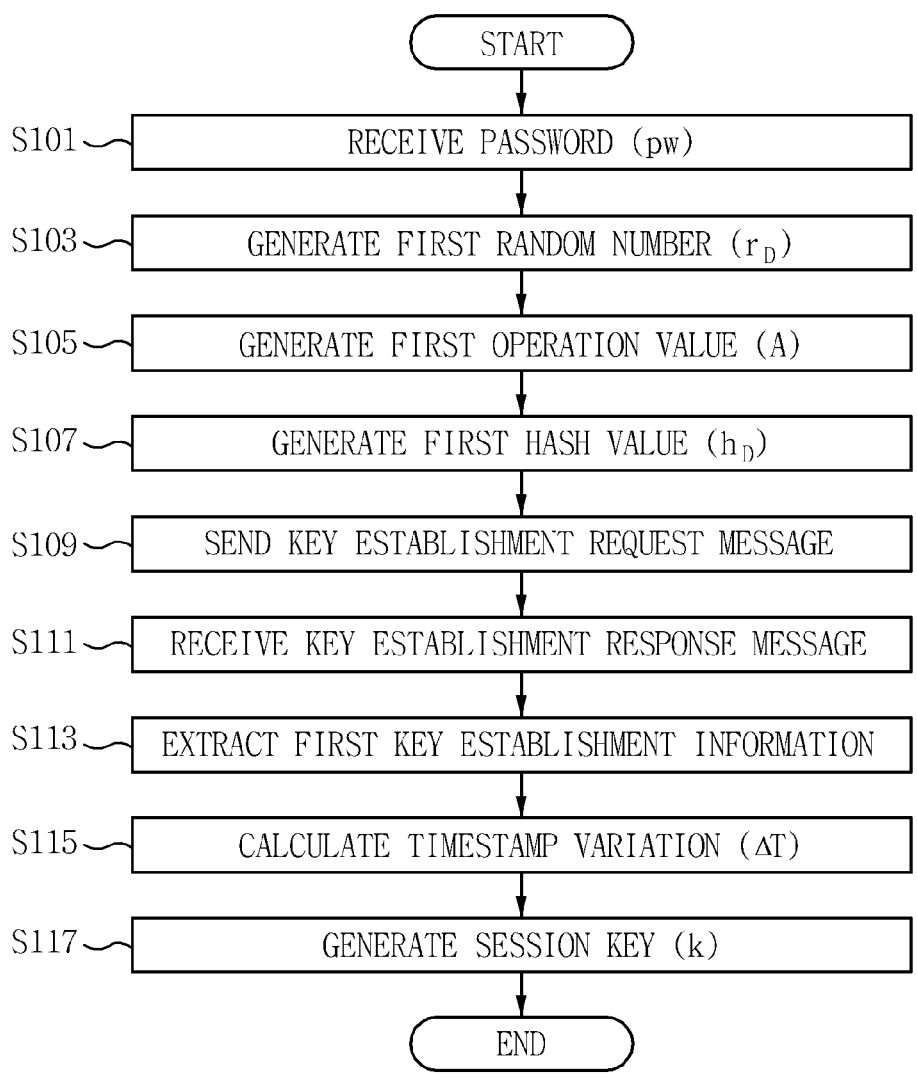
FIG. 3 is a flowchart showing a session key establishment method performed by a device according to an embodiment of the present invention.

FIG. 3 is a flowchart showing a method in which the device establishes a session key according to an embodiment of the present invention.

As shown in FIG. 3, the device 200 receives the preset password (hereinafter also referred to as a "pw") of the device 200 from a user so as to establish a session key between the device 200 and the authentication apparatus 110 at step S101.

Next, as the password (pw) is received, the device 200 generates a first random number (hereinafter referred to as "$r_D$") used to create a session key at step S103.

Thereafter, the device 200 generates a first operation value (hereinafter also referred to as "A") using the first random number $r_D$ at step S105. Here, the device 200 can calculate the first operation value A using the following Equation (1):

$$A = g^{r_D} \bmod n \qquad (1)$$

In Equation (1), "g" denotes an exponentiation operator, and "mod" denotes a modulo operator. Further, "$r_D$" denotes the first random number and "n" denotes the divisor of the modulo operator.

Next, the device 200 generates a first hash value (hereinafter also referred to as "$h_D$") using the received password (pw) and the timestamp of the device 200 (hereinafter also referred as "$T_D$") at step S107. In this case, the device 200 can calculate the first hash value $h_D$ using the following Equation (2).

$$h_D = H(pw \oplus T_D) \qquad (2)$$

In Equation (2), "H( )" denotes a hash function and "⊕" denotes an exclusive OR (hereinafter also referred to as "XOR") operation. Further, "pw" denotes the received password, and "$T_D$" denotes the timestamp of the device 200.

Thereafter, the device 200 sends a key establishment request message required to establish a session key between the device 200 and the authentication apparatus 110 to the authentication apparatus 110 at step S109. In this case, the key establishment request message includes the identifier of the device 200 (hereinafter also referred to as "$ID_D$"), the first hash value $h_D$, the timestamp $T_D$ of the device 200, and the first operation value A.

Next, the device 200 receives a key establishment response message from the authentication apparatus 110 as a response to the key establishment request message at step S111.

Thereafter, the device 200 extracts first key establishment information, required to establish a session key, from the received key establishment response message at step S113. Here, the first key establishment information includes a second random number (hereinafter also referred to as "$r_{AA}$") and the timestamp of the authentication agent 111 (hereinafter also referred to as "$T_{AA}$"). Here, the second random number $r_{AA}$ can be generated by the authentication agent 111 of the authentication apparatus 110.

Next, the device 200 generates a timestamp variation (hereinafter also referred to as "ΔT") using the timestamp $T_{AA}$ of the authentication agent 111 and the timestamp $T_D$ of the device 200 at step S115. In this case, the device 200 can calculate the timestamp variation $\Delta T$ using the following Equation (3), $$\Delta T = T_{AA} - T_D \qquad (3)$$

In Equation (3), "$T_{AA}$" denotes the timestamp of the authentication agent 111 and "$T_D$" denotes the timestamp of the device 200.

Thereafter, the device 200 generates a session key (hereinafter also referred to as "k") between the device 200 and the authentication apparatus 110 using the first random number $r_D$, the second random number $r_{AA}$, and the timestamp variation $\Delta T$ at step S117. Here, the device 200 can calculate the session key k using the following Equation (4):

$$k = g^{r_D r_{AA}} \oplus \Delta T \qquad (4)$$

In Equation (4), "g" denotes an exponentiation operator, and "$\oplus$" denotes an XOR operation. Further, "$r_D$" denotes the first random number, "$r_{AA}$" denotes the second random number, and "$\Delta T$" denotes the timestamp variation.

Next, a method in which the authentication apparatus establishes a session key according to an embodiment of the present invention will be described with reference to FIG. 4.

Figure 4:
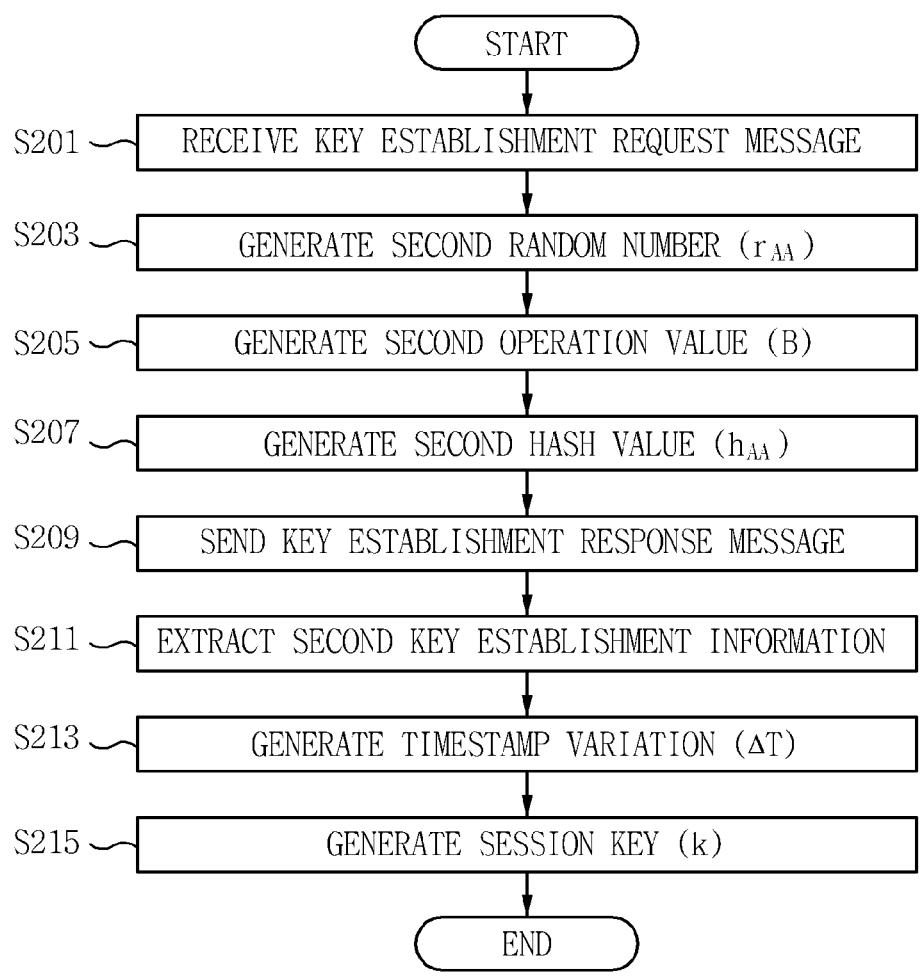
FIG. 4 is a flowchart showing a session key establishment method performed by the authentication apparatus according to an embodiment of the present invention.

FIG. 4 is a flowchart showing a method in which the authentication apparatus establishes a session key according to an embodiment of the present invention.

As shown in FIG. 4, the authentication agent 111 of the authentication apparatus 110 receives a key establishment request message required to establish a session key between the device 200 and the authentication apparatus 110 from the device 200 at step S201. In this case, the key establishment request message includes the identifier of the device 200 (hereinafter also referred to as "$ID_D$"), the first hash value $h_D$, the timestamp $T_D$ of the device 200, and the first operation value A.

Next, the authentication agent 111 of the authentication apparatus 110 generates a second random number $r_{AA}$ used to generate a session key when the key establishment request message is received at step S203.

Thereafter, the authentication agent 111 of the authentication apparatus 110 generates a second operation value (hereinafter also referred to as "B") using the second random number $r_{AA}$ at step S205. In this case, the authentication agent 111 of the authentication apparatus 110 can calculate the second operation value B using the following Equation (5).

$$B = g^{r_{AA}} \bmod n \qquad (5)$$

In Equation (5), "g" denotes an exponentiation operator, and "mod" denotes a modulo operator. Further, "$r_{AA}$" denotes the second random number and "n" denotes the divisor of the modulo operator.

Next, the authentication agent 111 of the authentication apparatus 110 generates a second hash value (hereinafter also referred to as "$h_{AA}$") using the identifier of the authentication agent 111 (hereinafter also referred to as "$ID_{AA}$") and the timestamp of the authentication agent 111 (hereinafter also referred to as "$T_{AA}$") at step S207. In this case, the authentication agent 111 of the authentication apparatus 110 can calculate the second hash value $h_{AA}$ using the following Equation (6):

$$h_{AA} = H(ID_{AA} \oplus T_{AA}) \qquad (6)$$

In Equation (6), "H( )" denotes a hash function, and "$\oplus$" denotes an XOR operation. Further, "$ID_{AA}$" denotes the identifier of the authentication agent 111, and "$T_{AA}$" denotes the timestamp of the authentication agent 111.

Thereafter, the authentication agent 111 of the authentication apparatus 110 sends a key establishment response message to the device 200 as a response to the received key establishment request message at step S209. Here, the key establishment response message includes the identifier $ID_{AA}$ of the authentication agent 111, the second hash value $h_{AA}$, the timestamp $T_{AA}$ of the authentication agent 111, and the second operation value B.

Next, the authentication agent 111 of the authentication apparatus 110 extracts second key establishment information required to establish a session key from the received key establishment request message at step S211. In this case, the second key establishment information includes the first random number $r_D$ and the timestamp $T_D$ of the device 200. In this case, the authentication agent 111 of the authentication apparatus 110 can extract the first random number $r_D$ from the first operation value A included in the key establishment request message.

Thereafter, the authentication agent 111 of the authentication apparatus 110 generates a timestamp variation (hereinafter also referred to as "$\Delta T$") using the timestamp $T_{AA}$ of the authentication agent 111 and the timestamp $T_D$ of the device 200 at step S213. In this case, the authentication agent 111 of the authentication apparatus 110 can calculate the timestamp variation $\Delta T$ using the following Equation (7):

$$\Delta T = T_{AA} - T_D \qquad (7)$$

In Equation (7), "$T_{AA}$" denotes the timestamp of the authentication agent 111, and "$T_D$" denotes the timestamp of the device 200.

Next, the authentication agent 111 of the authentication apparatus 110 generates a session key k between the device 200 and the authentication apparatus 110 using the first random number $r_D$, the second random number $r_{AA}$, and the timestamp variation $\Delta T$ at step S215. In this case, the device 200 can generate the session key k using the following Equation (8).

$$k = g^{r_D r_{AA}} \oplus \Delta T \qquad (8)$$

In Equation (8), "g" denotes an exponentiation operator, and "$\oplus$" denotes an XOR operation. Further, "$r_D$" denotes the first random number, "$r_{AA}$" denotes the second random number, and "$\Delta T$" denotes the timestamp variation.

Next, a method in which the device provides contents to a user according to an embodiment of the present invention will be described below with reference to FIG. 5.

Figure 5:
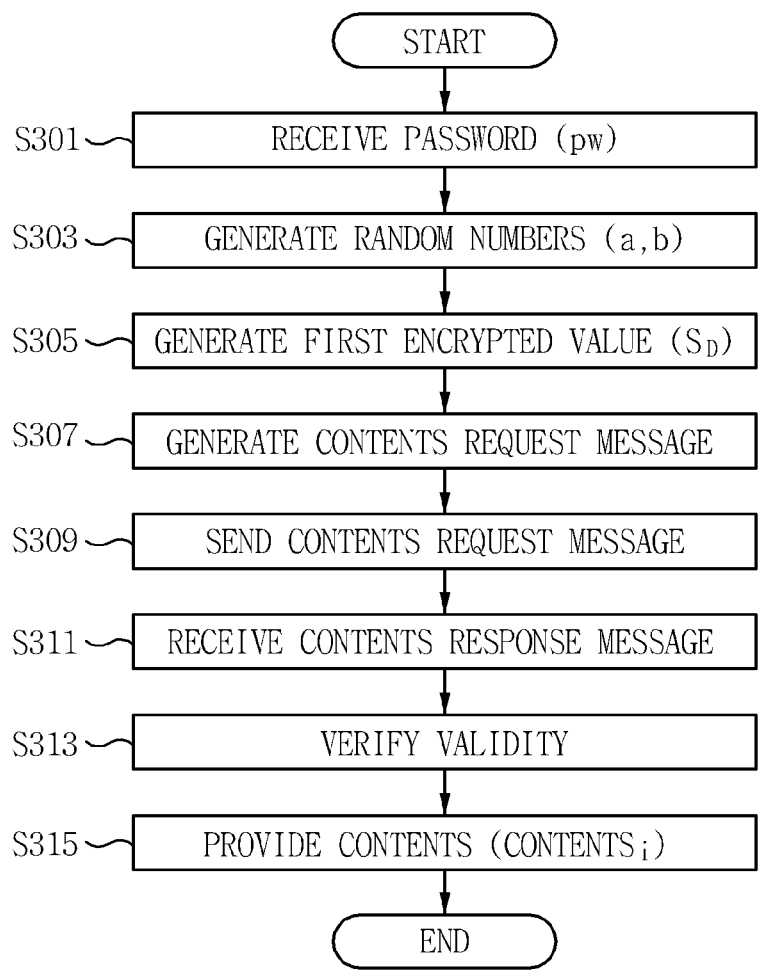
FIG. 5 is a flowchart showing a contents provision method according to an embodiment of the present invention.

FIG. 5 is a flowchart showing a contents provision method according to an embodiment of the present invention.

As shown in FIG. 5, the device 200 receives the preset password (pw) of the device 200 from the user so as to request contents (contents$_i$) from the IPTV system 100 at step S301.

Thereafter, the device 200 generates a third random number (hereinafter also referred to as "a") and a fourth random number (hereinafter also referred to as "b") which are used to authenticate the device 200 at step S303.

Next, the device 200 generates a first encrypted value (hereinafter also referred to as "$S_D$") using the received password (pw) at step S305. In this case, the device 200 can calculate the first encrypted value $S_D$ using the following Equation (9).

$$S_D = E_k(r_D \| H(pw) \| b) \qquad (9)$$

In Equation (9), "$E_k($ )" denotes an encryption operation using the session key k, "$\|$" denotes a concatenation operator, and "H( )" denotes a hash function. Further, "$r_D$" denotes the first random number, "pw" denotes the received password, and "b" denotes the fourth random number.

Thereafter, the device 200 generates a contents request message (hereinafter also referred to as an "$e_D$") using the generated first encrypted value $S_D$ at step S307. Here, the contents request message $e_D$ includes the identifier $ID_D$ of the device 200, the identifier $ID_C$ of the contents$_i$, the timestamp $T_D$ of the device 200, the first encrypted value $S_D$, the third random number a, and the fourth random number b.

Next, the device 200 sends the generated contents request message to the authentication apparatus 110 at step S309.

Thereafter, the device 200 receives a contents response message from the authentication apparatus 110 at step S311. In this case, the contents response message includes requested contents$_i$ and the service level of the contents$_i$ (hereinafter also referred to as "$SL_i$"). The contents response message may further include verification information about the verification of the contents response message.

Next, the device 200 verifies the validity of the received contents response message using the verification information at step S313. In this case, the device 200 extracts the greatest common divisor and the least common multiple of the third random number a and the fourth random number b using the verification information, and verifies the greatest common divisor and the least common multiple which are extracted using the third random number a and the fourth random number b, thus verifying the validity of the contents response message.

Thereafter, the device 200 provides the contents$_i$ included in the received contents response message to the user when the received contents response message is valid at step S315.

Next, a method in which the authentication apparatus performs authentication so as to provide requested contents according to an embodiment of the present invention will be described below with reference to FIG. 6.

Figure 6:
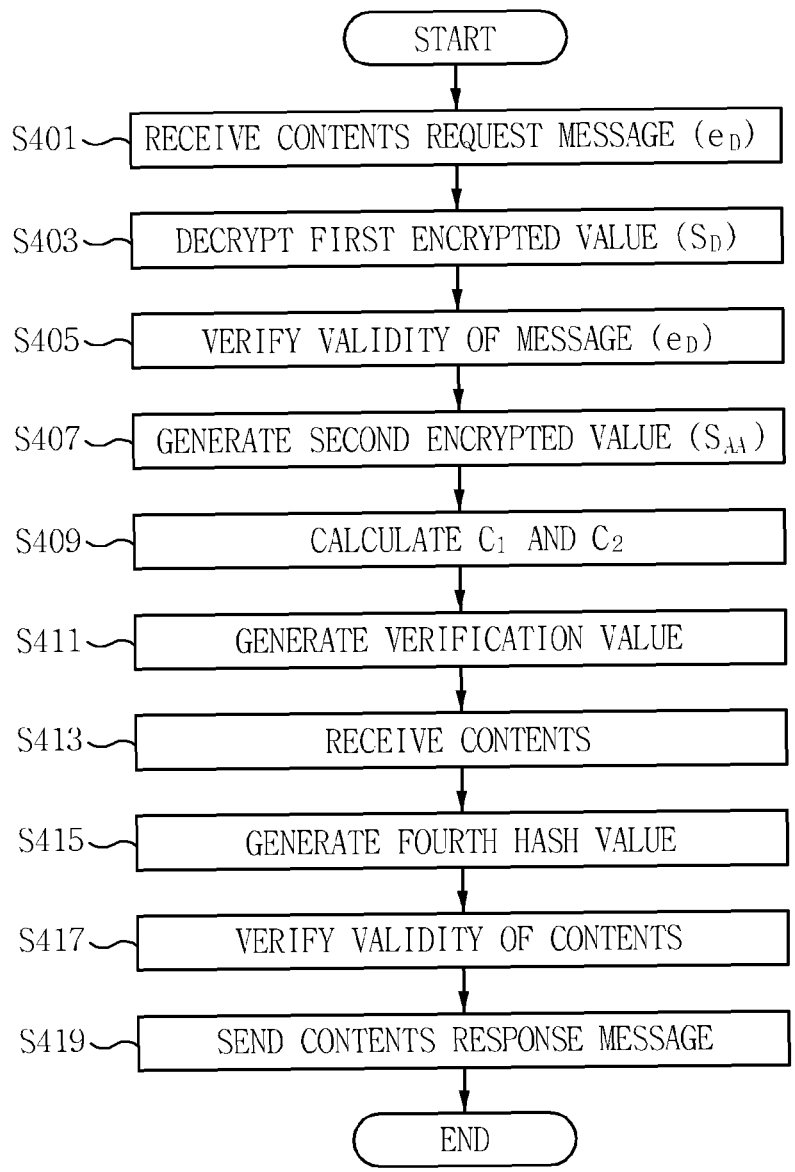
FIG. 6 is a flowchart showing an authentication method according to an embodiment of the present invention.

FIG. 6 is a flowchart showing an authentication method according to an embodiment of the present invention.

As shown in FIG. 6, the user agent 113 of the authentication apparatus 110 receives a contents request message $e_D$ from the device 200 at step S401. In this case, the contents request message $e_D$ includes the identifier $ID_D$ of the device 200, the identifier $ID_C$ of the contents$_i$, the timestamp $T_D$ of the device 200, the first encrypted value $S_D$, the third random number a and the fourth random number b.

Next, the authentication agent 111 of the authentication apparatus 110 decrypts the first encrypted value $S_D$ using a preset session key k between the device 200 and the authentication apparatus 110, and then extracts the first random number $r_D$ and a third hash value (hereinafter also referred to as "H(pw)") at step S403.

Thereafter, the authentication agent 111 of the authentication apparatus 110 verifies the validity of the contents request message $e_D$ using the first random number $r_D$ and the third hash value H(pw) at step S405. In this case, the authentication agent 111 of the authentication apparatus 110 compares the initially registered value of the device 200 with the first random number $r_D$ and the third hash value H(pw)), thus verifying the validity of the contents request message $e_D$. In this case, the authentication agent 111 of the authentication apparatus 110 can determine the identicalness between the first random number $r_D$ used for the generation of the session key k and the extracted first random number $r_D$, and can determine identicalness between the hash value of the preset password (pw) of the device 200 and the extracted third hash value H(pw).

Next, if the verification results of the contents request message $e_D$ are valid, the authentication agent 111 of the authentication apparatus 110 generates a second encrypted value (hereinafter also referred to as '$S_{AA}$') using the second random number $r_{AA}$, the fourth random number b, and the timestamp variation $\Delta T$ at step S407. In this case, the authentication agent 111 of the authentication apparatus 110 can calculate the second encrypted value $S_{AA}$ using the following Equation (10):

$$S_{AA}=E_k(b\|\Delta T\|r_{AA}) \quad (10)$$

In Equation (10), "$E_k(\ )$" denotes an encryption operation using the session key k, and "$\|$" denotes a connection for value. Further, "b" denotes the fourth random number, "$\Delta T$" denotes the timestamp variation, and "$r_{AA}$" denotes the second random number.

Thereafter, the control agent 115 of the authentication apparatus 110 calculates the greatest common divisor (hereinafter also referred to as "$C_1$") and the least common multiple (hereinafter also referred to as "$C_2$") of the third random number a and the fourth random number b at step S409. In this case, the control agent 115 of the authentication apparatus 110 can calculate the greatest common divisor $C_1$ and the least common multiple $C_2$ using the following Equation (11):

$$C_1=gcd(a,b)$$
$$C_2=lcm(a,b) \quad (11)$$

Next, the user agent 113 of the authentication apparatus 110 generates a first verification value (hereinafter also referred to as "X") and a second verification value (hereinafter also referred to as "Y") using the greatest common divisor $C_1$, the least common multiple $C_2$, and the second encrypted value at step S411. In this case, the user agent 113 of the authentication apparatus 110 can calculate the first verification value X and the second verification value Y using the following Equation (12):

$$X=(C_1 \oplus S_{AA})$$
$$Y=(C_2 \oplus S_{AA}) \quad (12)$$

In Equation (12), "$\oplus$" denotes an XOR operation. Further, "$C_1$" denotes the greatest common divisor of the third random number a and the fourth random number b, "$C_2$" denotes the least common multiple of the third random number a and the fourth random number b, and "$S_{AA}$" denotes the second encrypted value.

Thereafter, the policy agent 117 of the authentication apparatus 110 receives contents (hereinafter also referred to as "contents$_i$") corresponding to the identifier $ID_C$ of the contents from the contents server 130 at step S413. Here, the received contents$_i$ corresponds to data in which only a selective region is encrypted.

Next, the policy agent 117 of the authentication apparatus 110 generates a fourth hash value (hereinafter also referred to as "$h_{PA}$") using the received contents$_i$ at step S415. In this case, the policy agent 117 of the authentication apparatus 110 can calculate the fourth hash value $h_{PA}$ using the following Equation (13):

$$h_{PA}=H(C_1 \oplus C_2 \| SL_i \| T_{PA}) \quad (13)$$

In Equation (13), "$H(\ )$" denotes a hash function, "$\oplus$" denotes an XOR operation, and "$\|$" denotes a concatenation operator. Further, "$C_1$" denotes the greatest common divisor of the third random number a and the fourth random number b, "$C_2$" denotes the least common multiple of the third random number a and the fourth random number b, "$SL_i$" denotes the service level of the contents$_i$, and "$T_{PA}$" denotes the timestamp of the policy agent 117.

Thereafter, the authentication agent 111 of the authentication apparatus 110 verifies the validity of the received contents$_i$ using the generated fourth hash value $h_{PA}$ at step S417.

Next, the policy agent 117 of the authentication apparatus 110 sends a contents response message to the device 200 as a response to the contents request message $e_D$ at step S419. In this case, the contents response message includes the contents$_i$, the first verification value X, the second verification value Y, and the service level of the contents$_i$.

As described above, the present invention is advantageous in that security against a service denial attack can be maintained using a timestamp variation between the authentication apparatus and the device so as to generate mutual session keys. Further, the present invention is advantageous in that an integrity service for an IPTV service can be provided using session key-based secure communication related to transmission information and hash algorithms.

As described above, optimal embodiments have been disclosed in the drawings and the specification. In this case, although specific terms have been used, they are only intended to describe the present invention and are not intended to limit meanings and restrict the scope of the present invention as disclosed in the accompanying claims. Therefore, those skilled in the art will appreciate that various modifications and equivalent embodiments are possible from those embodiments. Therefore, the scope of the present invention should be defined by the technical spirit of the accompanying claims.

What is claimed is:

1. An authentication method for a non-real-time Internet Protocol Television (IPTV) system, comprising:
    decrypting a first encrypted value included in a contents request message received from a device using a session key, and then verifying validity of the contents request message;
    generating a second encrypted value by encrypting a timestamp variation between an authentication apparatus and the device using the session key if verification results of the contents request message are valid;
    generating verification information for verifying the authentication apparatus by using the second encrypted value and a plurality of random numbers included in the contents request message and wherein the generating the verification information further comprises calculating a common divisor and a common multiple of a first random number and a second random number which are included in the plurality of random numbers;
    generating a first verification value using the common divisor and the second encrypted value; and
    generating a second verification value using the common multiple and the second encrypted value; and
    sending the verification information, together with contents corresponding to the contents request message, to the device.

2. The authentication method of claim 1, wherein the verifying is configured to compare a decrypted value, extracted by decrypting the first encrypted value using the session key, with registered information of the device, thus verifying the validity of the contents request message.

3. The authentication method of claim 2, wherein the verifying is configured to determine identicalness between the decrypted value and a hash value of a password of the device, thus verifying the validity of the contents request message.

4. The authentication method of claim 1, wherein the common divisor is a greatest common divisor of the first random number and the second random number, and the common multiple is a least common multiple of the first random number and the second random number.

5. An authentication apparatus for a non-real-time Internet Protocol Television (IPTV) system, comprising:
    an authentication agent for establishing a session key between a device and the authentication apparatus, and verifying validity of a data request message received from the device using the session key;
    a user agent for generating verification information by which the device is capable of verifying the authentication apparatus;
    a policy agent for sending a data response message, which includes data requested by the data request message and the verification information, to the device key wherein the authentication agent establishes the session key using a variation between a timestamp of the device and a timestamp of the authentication agent, and generates an encrypted value required to generate the verification information by encrypting the variation using the session key; and
    a control agent for calculating a greatest common divisor and a least common multiple of a first random number and a second random number which are included in the data request message, and the user agent generates the verification information using the encrypted value, the greatest common divisor, and the least common multiple.

6. The authentication apparatus of claim 5, wherein the policy agent sends the data response message, which further includes a service level of the data, to the device.

* * * * *